(12) United States Patent
Inagi (10) Patent No.: US 8,732,929 B2
(45) Date of Patent: May 27, 2014

(54) GAS TANK AND MANUFACTURING METHOD OF GAS TANK

(75) Inventor: Shusuke Inagi, Okazaki (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 368 days.

(21) Appl. No.: 13/259,921

(22) PCT Filed: Apr. 16, 2009

(86) PCT No.: PCT/JP2009/057658
§ 371 (c)(1),
(2), (4) Date: Sep. 23, 2011

(87) PCT Pub. No.: WO2010/119542
PCT Pub. Date: Oct. 21, 2010

(65) Prior Publication Data
US 2012/0023731 A1 Feb. 2, 2012

(51) Int. Cl.
*B23P 17/00* (2006.01)
(52) U.S. Cl.
USPC ........................................................ 29/419.1
(58) Field of Classification Search
USPC ........ 29/419.1, 428, 434, 439, 455.1; 156/69, 156/172, 171, 182, 266
See application file for complete search history.

(56) References Cited

U.S. PATENT DOCUMENTS

| | | | | |
|---|---|---|---|---|
| 4,453,995 A | * | 6/1984 | Morrisey | 156/172 |
| 4,671,831 A | | 6/1987 | Mohan | |
| 2008/0111322 A1 | | 5/2008 | Otsubo et al. | |

FOREIGN PATENT DOCUMENTS

| | | |
|---|---|---|
| JP | 63-139734 A | 6/1988 |
| JP | 11-036986 A | 2/1999 |
| JP | 2000-266289 A | 9/2000 |
| JP | 2002-188794 A | 7/2002 |
| JP | 2003-287193 A | 10/2003 |
| JP | 2005-048918 A | 2/2005 |
| JP | 2006-132746 A | 5/2006 |
| WO | 98/34064 A1 | 8/1989 |
| WO | 02/30613 A1 | 4/2002 |
| WO | 2006/095546 A1 | 9/2006 |

OTHER PUBLICATIONS

Extended European Search Report (EESR) of EP 09843 323.8 issued Aug. 16, 2012.
International Search Report mailed Jul. 7, 2009 of PCT/JP2009/057658.

* cited by examiner

*Primary Examiner* — John C Hong
(74) *Attorney, Agent, or Firm* — Kenyon & Kenyon LLP (57) ABSTRACT

The objective is to enable the formation of an outer circumferential layer by a filament winding process to be performed appropriately, and to achieve the weight reduction of a gas tank by reducing the weight of a mouthpiece. The gas tank comprises a mouthpiece attached to an end of a tank main body in its axis direction, and an outer circumferential layer formed over an outer circumferential surface of the tank main body and an outer circumferential surface of the mouthpiece by a filament winding process. On the end of the tank main body in the axis direction, a recess section, in which an outside end surface of the mouthpiece is embedded in the inner side from an outside end surface of the outer circumferential layer, is formed.

3 Claims, 9 Drawing Sheets

PRIOR ART

GAS TANK AND MANUFACTURING METHOD OF GAS TANK

This is a 371 national phase application of PCT/JP2009/057658 filed 16 Apr. 2009, the contents of which are incorporated herein by reference.

TECHNICAL FIELD

The present invention relates to a gas tank and a manufacturing method of the gas tank, the gas tank comprising: a mouthpiece attached to the end of a tank main body in its axis direction; and an outer circumferential layer formed over the outer circumferential surface of the tank main body and the outer circumferential surface of the mouthpiece by a filament winding process.

BACKGROUND OF THE INVENTION

A high-pressure tank is used as a supply source of a fuel gas in, for example, a fuel cell system disposed in a vehicle such as a car. Generally, the high-pressure tank comprises: a metal mouthpiece attached to both ends of a tank main body in its axis direction; and a reinforcing fiber layer formed by winding a reinforcing fiber around over the outer circumferential surface of the tank main body and the outer circumferential surface of the mouthpiece by a filament winding process.

PRIOR ART DOCUMENTS

Patent Documents

Patent Document 1: Japanese laid-open patent publication 2000-266289 A
Patent Document 2: Japanese laid-open patent publication 2003-287193 A

SUMMARY OF THE INVENTION

Problem to be Solved by the Invention

Figure 9:
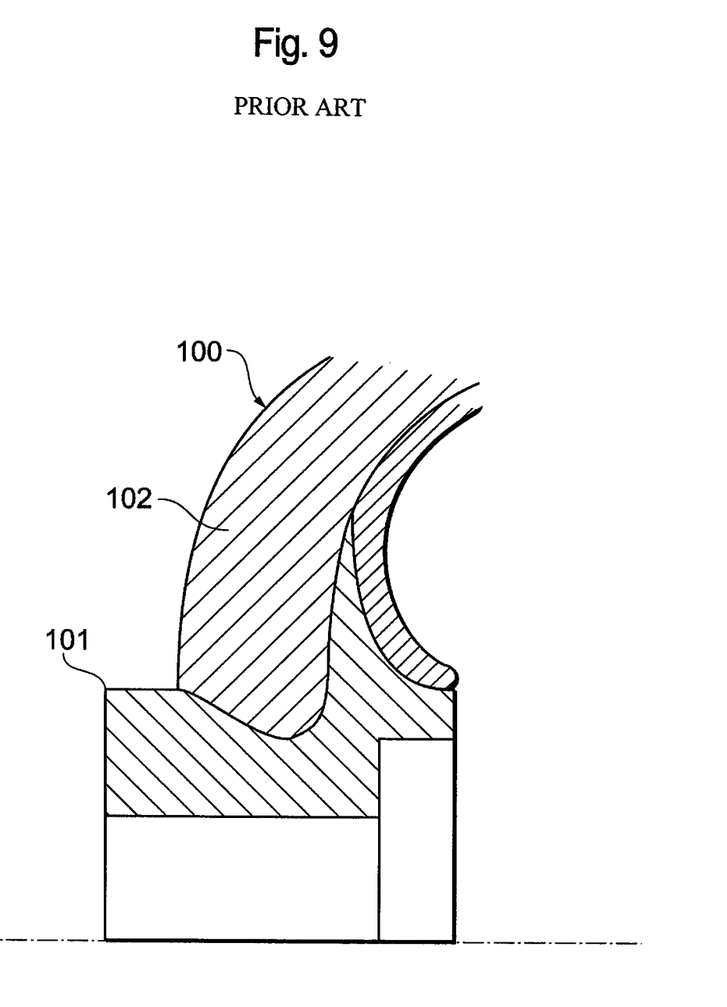
FIG. 9 is an enlarged sectional view of the mouthpiece before modification.

However, in the step of winding a fiber around the outer circumferential surface of the tank main body by a filament winding process, for example, the fiber is wound around so that the fiber is caught by and folded back at the mouthpiece 101 at the end of the tank main body 10 in its axis direction as shown in FIG. 9 in helical winding. Thus, a thick reinforcing fiber layer 102 can be formed on the outer circumferential surface of the mouthpiece 101 having a substantially cylindrical shape. Hence, a mouthpiece is required to have a sufficient length in the axis direction, because it has the role of serving as a part of a mandrel of the reinforcing fiber layer. As a result, the mouthpiece becomes larger and heavier. When the mouthpiece becomes heavier, the high-pressure tank becomes heavier, and it is not preferable from the viewpoint of carrying a gas tank or the fuel efficiency or the like of a vehicle in which a gas tank is disposed.

The present invention has been developed in view of such situation, and an object thereof is to enable the formation of an outer circumferential surface, such as a reinforcing fiber layer, by a filament winding process to be performed appropriately, and to achieve the weight reduction of a gas tank by reducing the weight of a mouthpiece.

Means for Solving the Problem

The present invention is a manufacturing method of a gas tank comprising: coupling a connection part of a rotating shaft, which has an outer circumferential surface which continues smoothly to an outer circumferential surface of a mouthpiece, to a mouthpiece attached to an end of a tank main body in its axis direction; winding a fiber around over an outer circumferential surface of the tank main body, an outer circumferential surface of the mouthpiece and a part of an outer circumferential surface of the connecting part, while rotating the tank main body by the rotating shaft, to form an outer circumferential layer on the outer circumferential surface of the tank main body, the outer circumferential surface of the mouthpiece and a part of the outer circumferential surface of the connecting part; and detaching the connecting part of the rotating shaft from the mouthpiece to form, on the end of a gas tank in an axis direction thereof, a recess section in which an outside end surface of the mouthpiece in the axis direction is embedded in an inner side from an outside end surface of the outer circumferential layer in the axis direction.

The distal end side of the connecting part of the rotating shaft may have an outer diameter which gradually decreases closer to an distal end.

A mould release film may be affixed to the outer circumferential surface of the connecting part of the rotating shaft.

Advantageous Effects of the Invention

According to the present invention, the formation of an outer circumferential layer by a filament winding process can be performed appropriately, and the weight reduction of a gas tank can be achieved by reducing the weight of a mouthpiece.

MODE FOR CARRYING OUT THE INVENTION

Figure 1:
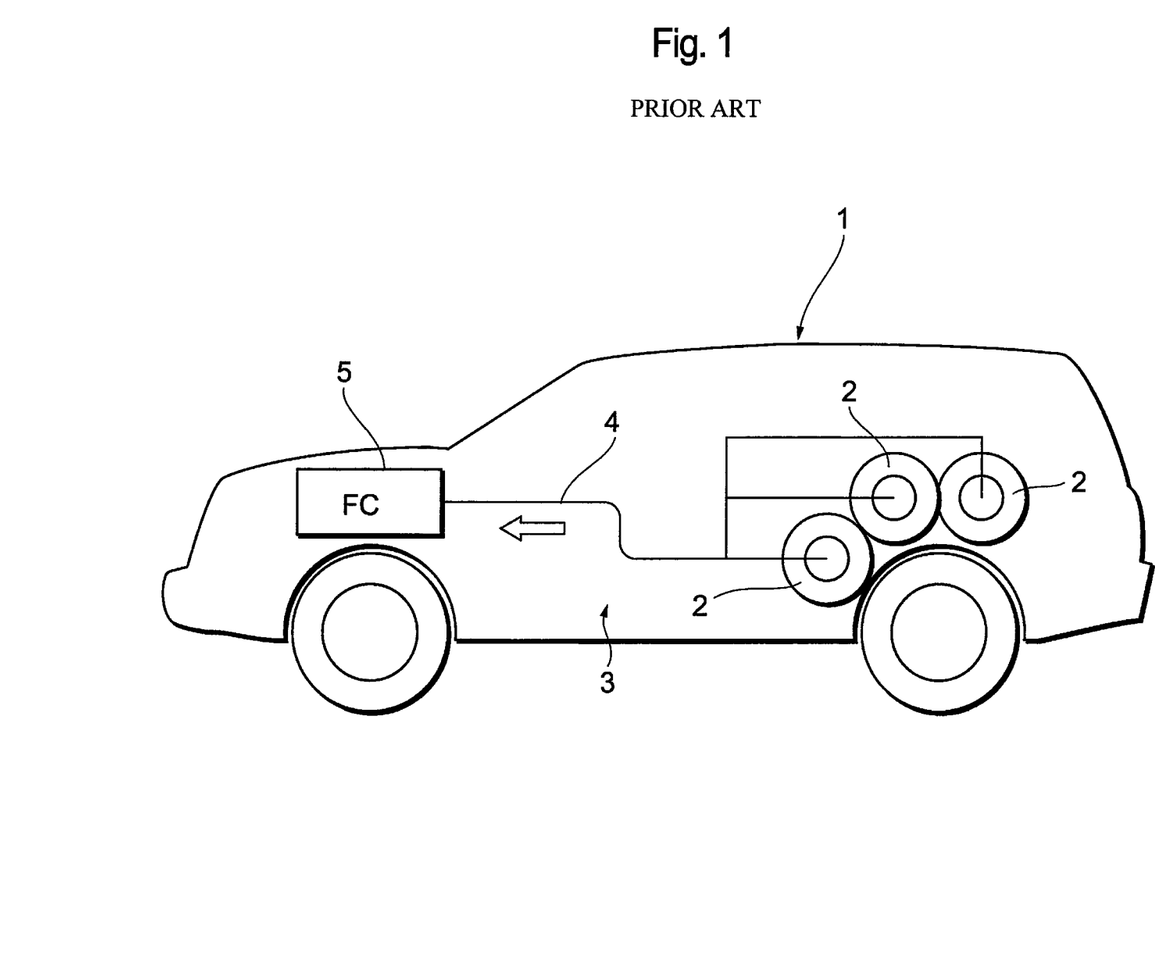
FIG. 1 is a schematic diagram of a fuel cell vehicle in which high-pressure gas tanks are disposed.

Hereinafter, a preferable embodiment of the present invention will be described with reference to the drawings. FIG. 1 is a schematic diagram of a fuel cell vehicle 1 in which gas tanks according to the present embodiment are disposed.

In the fuel cell vehicle 1, for example, three high-pressure gas tanks 2 are disposed in the rear part of a car body. The high-pressure gas tanks 2 constitute a part of a fuel cell system 3 so that a fuel gas can be supplied to a fuel cell 5 from the high-pressure gas tanks 2 through a gas supply line 4. The fuel gas stored in the high-pressure gas tanks 2 is a combustible high-pressure gas such as a hydrogen gas. It is to be noted that the high-pressure gas tanks 2 can be applied not only to the fuel cell vehicle 1 but also to vehicles such as an electric vehicle and a hybrid vehicle, various mobile objects (e.g., a boat, an airplane, a robot, etc.) and stational facilities (a house and a building).

Figure 2:
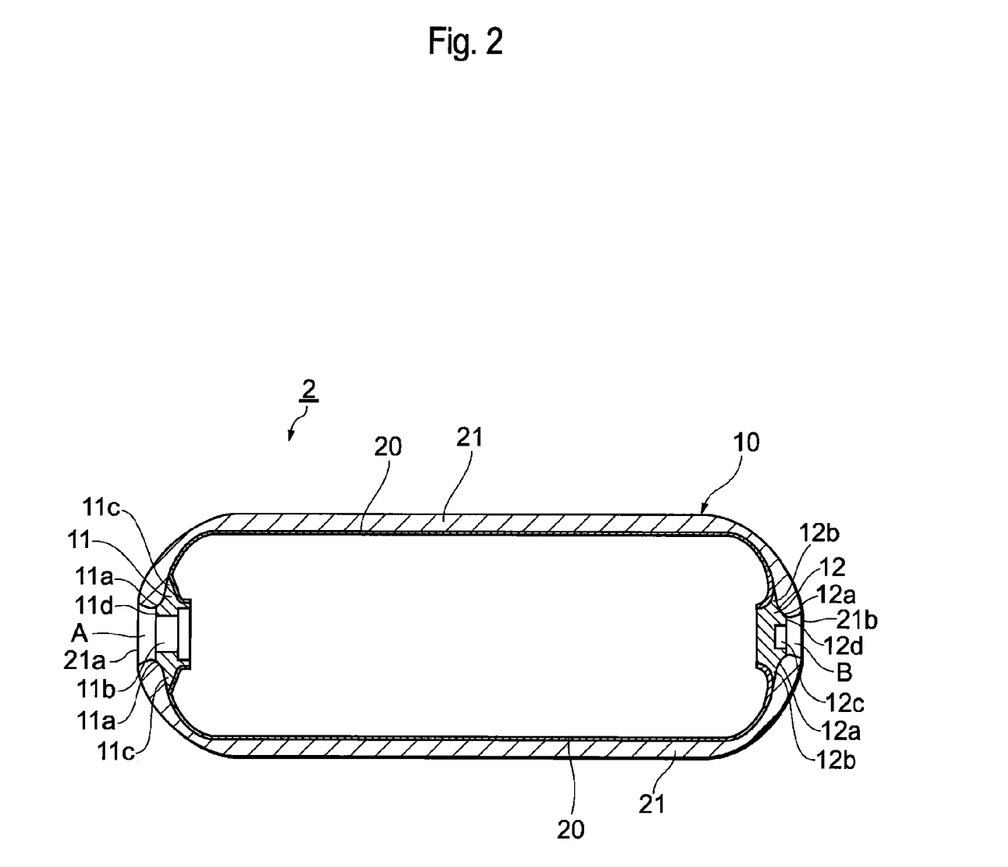
FIG. 2 is a vertically sectional view schematically showing a configuration of the high-pressure gas tank.

FIG. 2 is a vertically sectional view schematically showing the constitution of the high-pressure gas tank 2. The high-pressure gas tank 2 comprises a tank main body 10 which is, for example, a substantially elliptic body, and mouthpieces 11 and 12 provided on both ends of the tank main body 10 in the axis direction of the tank main body 10 (the horizontal direction of FIG. 2). Meanwhile, the mouthpiece 12 is an end boss which does not allow a gas flowing in/out between the tank main body 10 and the outside thereof (hereinafter, the mouthpiece 12 is referred as the "end boss 12").

The tank main body 10 has, for example, a double layer structure, and comprises an inner resin liner 20 and an FRP (Fiber Reinforced Plastics) layer 21 as an outer circumferential layer which covers the outer circumferential surface of the resin liner 20.

The resin liner 20 has almost the same substantially elliptic shape as that of the tank main body 10. The resin liner 20 is made of a polyamide resin such as nylon 6 or nylon 6, 6.

The FRP layer 21 is made of a resin-containing fiber by a filament winding process. The FRP layer 21 is formed over the outer circumferential surface of the tank main body 10, the outer circumferential surface 11a of the mouthpiece 11 and the outer circumferential surface 12a of the end boss 12. As the resin of the FRP layer 21, for example, an epoxy resin, a denatured epoxy resin, an unsaturated polyester resin or the like is used. Moreover, as the fiber, for example, a carbon fiber, a metal fiber or the like is used.

Figure 3:
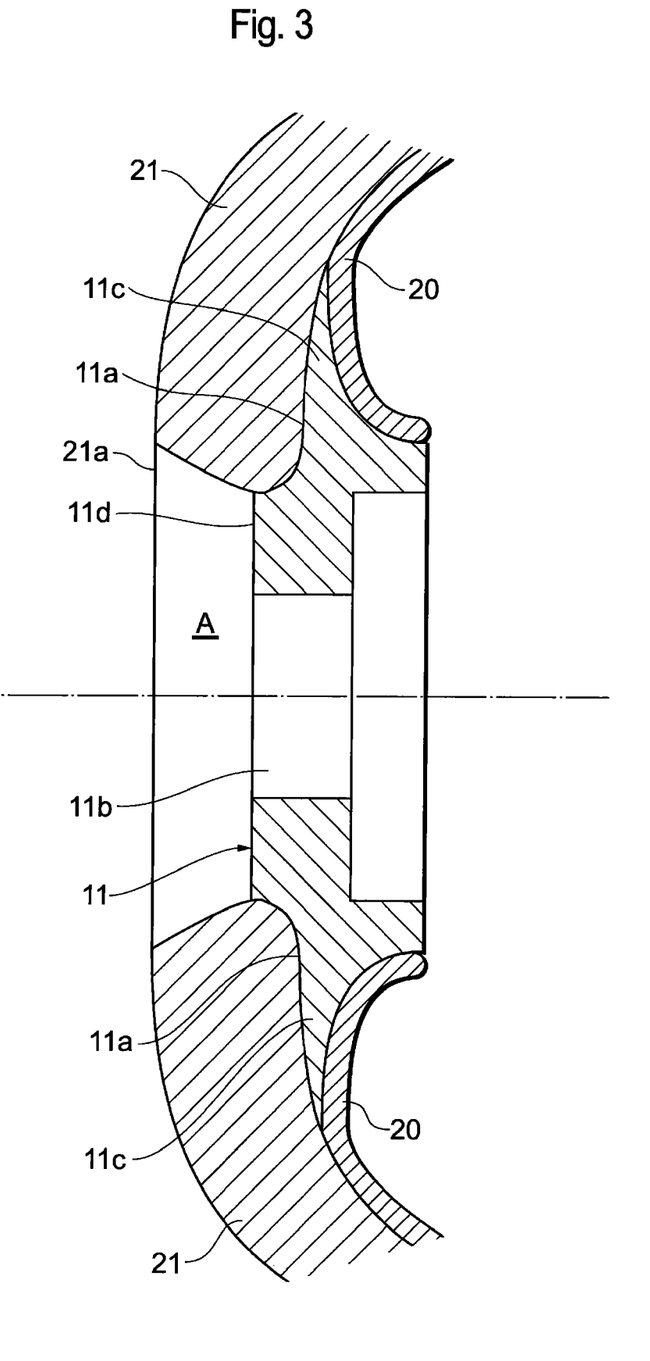
FIG. 3 is an enlarged vertically sectional view of an end of the high-pressure gas tank on the mouthpiece side.

One end of the resin liner 20 has an opening, and the mouthpiece 11 is attached to such opening part. As shown in FIGS. 2 and 3, the mouthpiece 11 is formed into a substantially disk-like shape having a through-hole 11b in the center thereof, has a large diameter part 11c in the center in an axis direction, and both ends in the axis direction gradually narrow the diameter. A tilted surface on the outside of the large diameter part 11c is an outer circumferential surface 11a of the mouthpiece 11. The mouthpiece ills made of, for example, aluminum, iron or the like. In the mouthpiece 11, for example, an outside end surface 11d is embedded in the inner side from an outside end surface 21a of the FRP layer 21, and thereby a recess section A is formed on the end of the tank main body 10.

Figure 4:
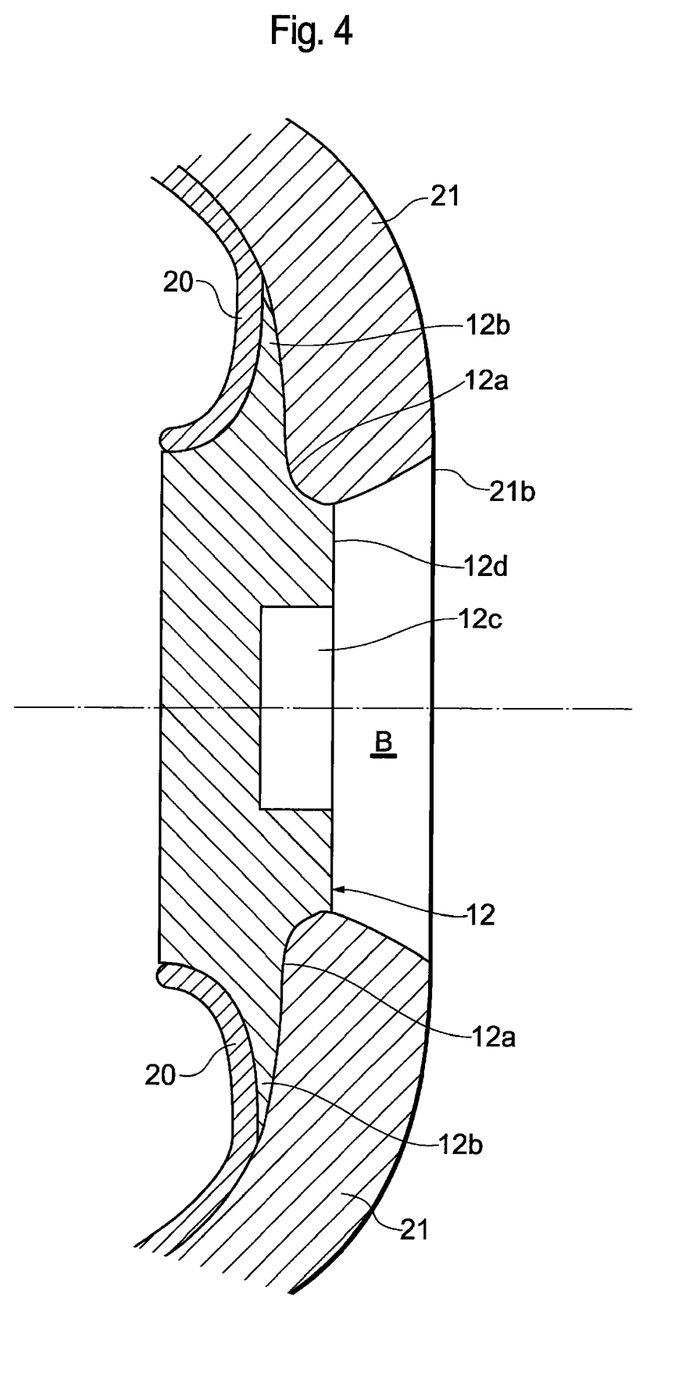
FIG. 4 is an enlarged vertically sectional view of an end of the high-pressure gas tank on the end boss side.

Further, the other end of the resin liner 20 has an opening, and the end boss 12 is attached to such opening part. As shown in FIGS. 2 and 4, the end boss 12 is formed into a disk-like shape, has a large diameter part 12b in the center in an axis direction, and the both ends in the axis direction gradually narrow the diameter. A tilted surface on the outside of the large diameter part 12b is an outer circumferential surface 12a of the end boss 12. Unlike the mouthpiece 11, the end boss 12 does not have a through-hole, but has a recess section 12c formed on an outside end surface 12d. The end boss 12 is made of, for example, aluminum, iron or the like. In the end boss 12, for example, the outside end surface 12d is embedded in the inner side from an outside end surface 21b of the FRP layer 21, and thereby a recess section B is formed on the end of the tank main body 10.

Figure 5:
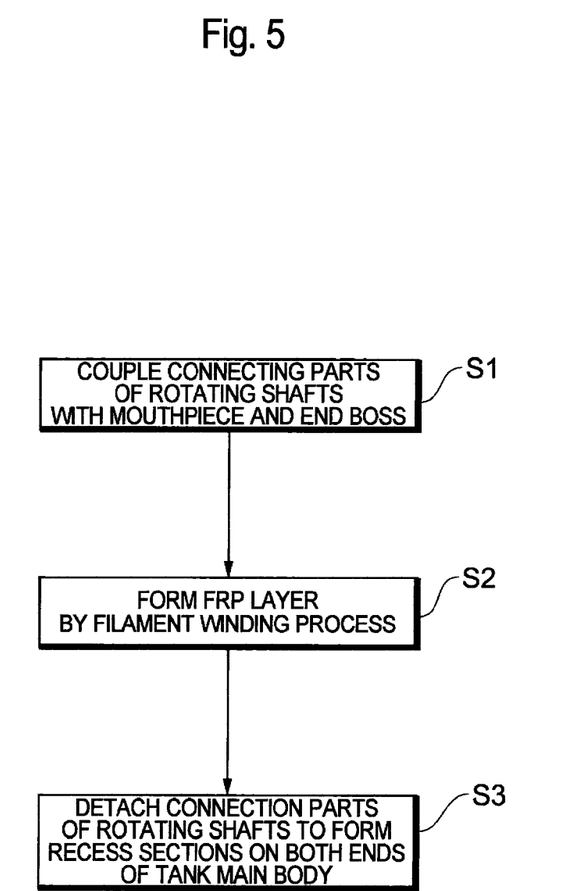
FIG. 5 is a flowchart illustrating the main steps of a manufacturing method of the high-pressure gas tank.

Next, a manufacturing method of the high-pressure gas tank 2 configured in the above manner will be described. FIG. 5 is a flowchart illustrating one example of the main steps of such manufacturing method.

Figure 6:
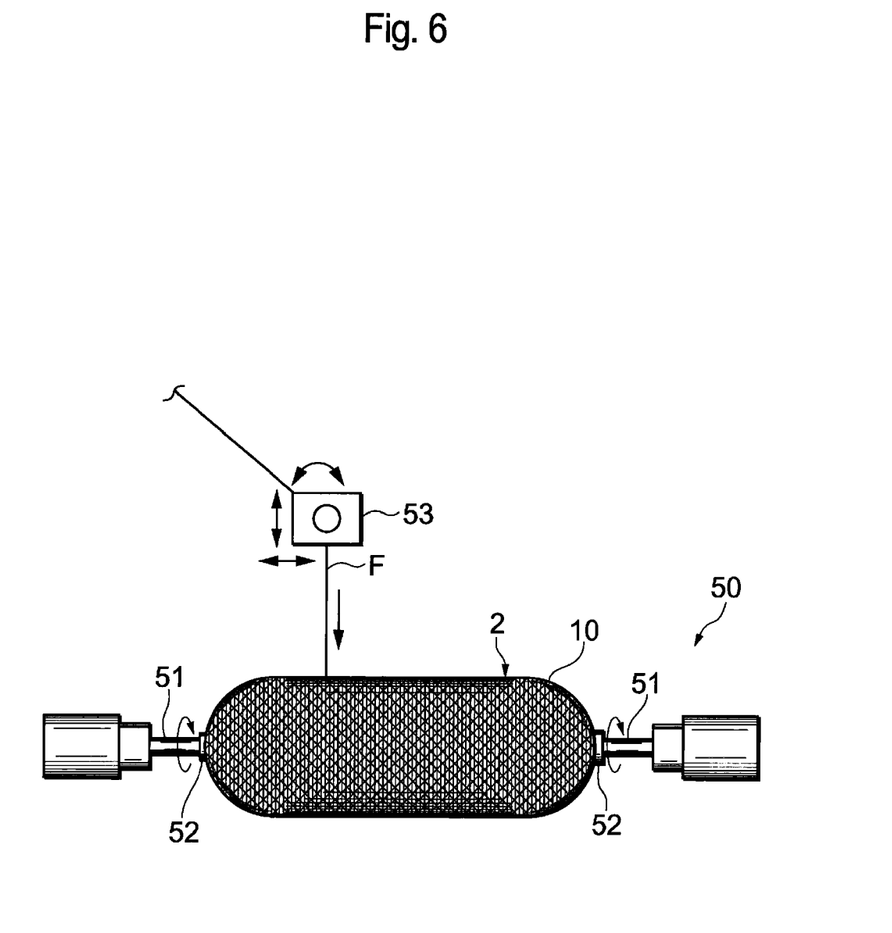
FIG. 6 is an explanatory view showing behavior of a fiber winding device winding a resin fiber around the resin liner.
Figure 7:
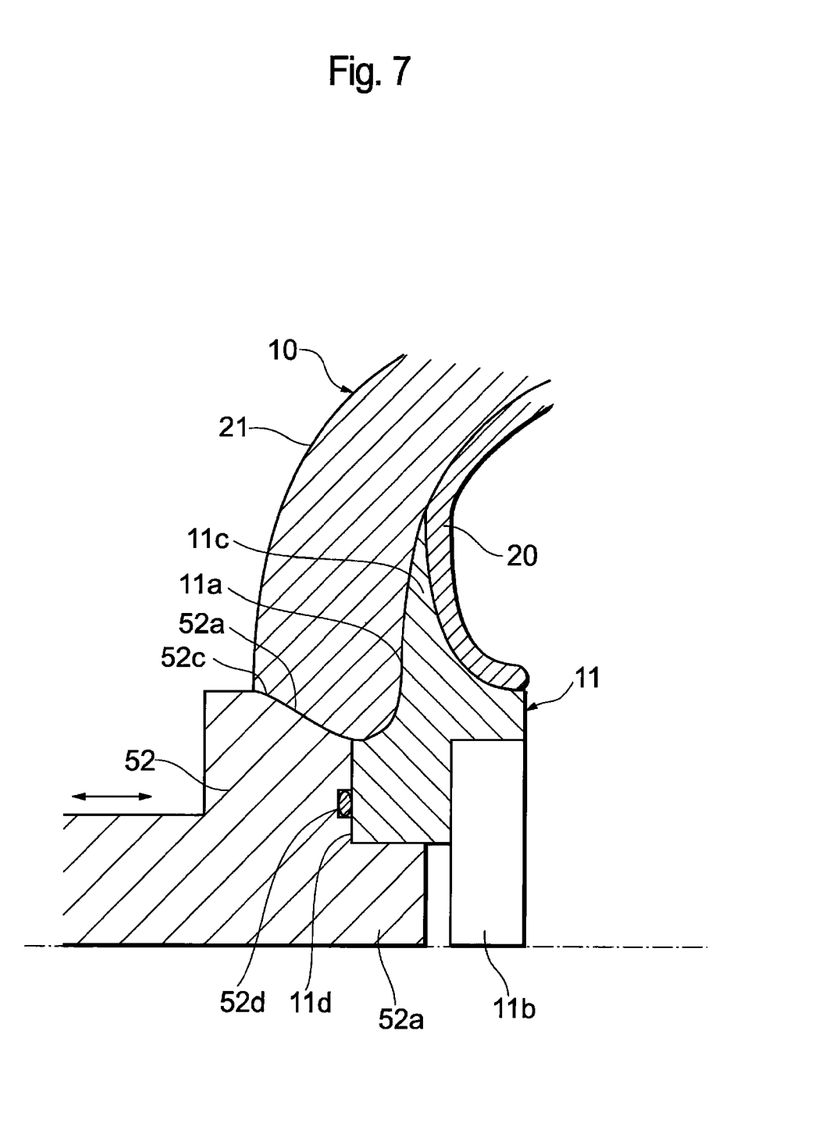
FIG. 7 is an enlarged vertically sectional view of an end of the high-pressure tank on the mouthpiece side to which a connection part is coupled.
Figure 8:
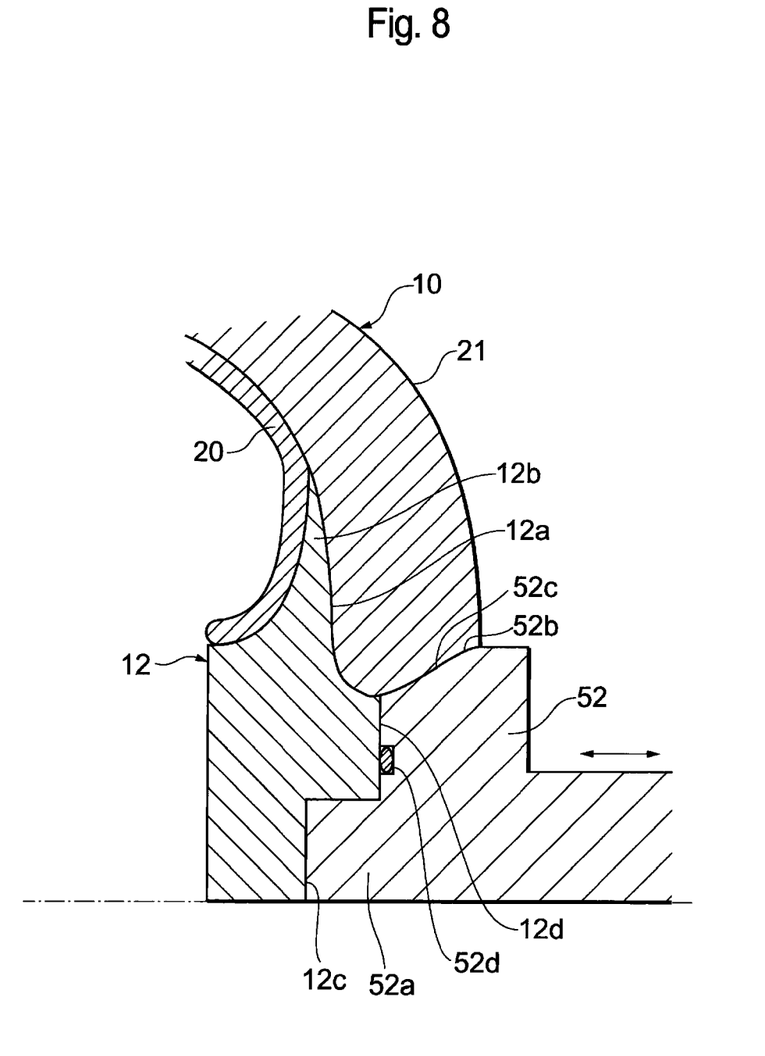
FIG. 8 is an enlarged vertically sectional view of an end of the high-pressure tank on the end boss side to which a connection part is coupled.

First, the mouthpiece 11 and end boss 12 are attached to both ends of the injection-formed resin liner 20. Then, as shown in FIG. 6, connecting parts 52 of rotating shafts 51 of a fiber winding device 50 are coupled to the mouthpiece 11 and end boss 12 (step S1 of FIG. 5). The connecting parts 52 have, for example, as shown in FIGS. 7 and 8, on their distal ends: protruding parts 52a which fit into a through-hole 11b of the mouthpiece 11 and the recess section 12c of the end boss 12; and an outer circumferential surfaces 52b which continue smoothly to the outer circumferential surface 11a of the mouthpiece 11 and the outer circumferential surface 12a of the end boss 12 when the protruding part 52a fits into the recess section 12c. The outer circumferential surface 52b on the distal end side of the connecting part 52 is a tilted surface whose outer diameter gradually decreases closer to a distal end. In addition, a mould release film 52c is affixed to the outer circumferential surface 52b. The coupling of the connecting parts 52 with the mouthpiece 11 and end boss 12 is performed by, for example, fitting the protruding parts 52a of the connecting parts 52 into the through-hole 11b of the mouthpiece 11 and the recess section 12c of the end boss 12. In such case, O rings 52d are interposed between the outside end surface 11d of the mouthpiece 11 and the outside end surface 12d of the end boss 12 and the connection parts 52.

Next, the rotating shafts 51 rotate, whereby the resin liner 20 is rotated to wind reinforcing fibers F around the outer circumferential surface of the resin liner 20 (tank main body 10), the outer circumferential surface 11a of the mouthpiece 11, the outer circumferential surface 12a of the end boss 12, and a part of the outer circumferential surfaces 52b of the connecting parts 52. As shown in FIG. 6, the reinforcing fiber F is impregnated with a thermoplastic resin at an upstream part. Afterward, the angle of the fiber is adjusted by a fiber guide part 53, thereby winding the fiber around the resin liner 20. The winding in such case is performed by helical winding or hoop winding. In helical winding, the reinforcing fibers F are wound so that the fibers are caught by and folded back at the outer circumferential surface 11a of the mouthpiece 11, the outer circumferential surface 12a of the end boss 12 and a part of the outer circumferential surfaces 52b of the connecting parts 52 (a part near the mouthpiece 11 or near the end boss 12). Thus, as shown in FIGS. 7 and 8, the reinforcing fibers F are wound around over the outer circumferential surface of the resin liner 20 (tank main body 10), the outer circumferential surface 11a of the mouthpiece 11, the outer circumferential surface 12a of the end boss 12, and the outer circumferential surface 52b of each of the connecting parts 52, thereby the FRP layer 21 having a predetermined thickness is formed (step S2 of FIG. 5).

Then, after the FRP layer 21 is cured to a certain degree, the connecting parts 52 are detached from the mouthpiece 11 and the end boss 12. Thus, as shown in FIGS. 3 and 4, the recess section A where the outside end surface 11d of the mouthpiece 11 is embedded in the inner side from the outside end surface 21a of the FRP layer 21 and the recess section B where the outside end surface 12d of the end boss 12 is embedded in the inner side from the outside end surface 21b of the FRP layer 21 are formed on both ends of the tank main body 10 in its axis direction (step S3 of FIG. 5).

According to the above embodiment, the outside end surface 11d of the mouthpiece 11 and the outside end surface 12d of the end boss 12 are embedded in the inner side from the outside end surfaces 21a, 21b of the FRP layer 21 to form the recess sections A, B on the ends of the tank main body 10, and therefore, the lengths of the mouthpiece 11 and the end boss 12 in the axis direction can be shortened accordingly. Thus, the weights of the mouthpiece 11 and end boss 12 can be reduced, allowing the weight of the high-pressure gas tank 2 to be reduced. In addition, the fitting of the connecting parts 52 of the rotating shafts 51 into the recess sections A, B allows the reinforcing fibers F to be caught by the outer circumferential surfaces 52b of the connection parts 52, the outer circumferential surface 11a of the mouthpiece 11 and the outer circumferential surface 12a of the end boss 12, therefore, the formation of the FRP layer 21 by a filament winding process can be performed appropriately.

When forming the FRP layer 21, the recess sections A, B are formed into the shapes of the connecting parts 52 of the rotating shafts 51 coupled to the mouthpiece 11 and the end boss 12, and therefore, the formation of the FRP layer 21 by a filament winding process can be performed appropriately, as described above.

The manufacturing method of the high-pressure gas tank 2 described in the above embodiment comprises the steps of: coupling the connecting parts 52 of the rotating shafts 51 to the mouthpiece 11 and the end boss 12; while rotating the tank main body 10 by the rotating shafts 51, winding the reinforcing fibers F around over the outer circumferential surface of the resin liner 20, the outer circumferential surface 11a of the mouthpiece 11 and the outer circumferential surface 12a of the end boss 12, and a part of the outer circumferential surfaces 52b of the connection parts 52, to form the FRP layer 21 on the outer circumferential surface 11a of the mouthpiece 11 and the outer circumferential surface 12a of the end boss 12, and a part of the outer circumferential surfaces 52b of the connection parts 52; detaching the connecting parts 52 of the rotating shafts 51 from the mouthpiece 11 and the end boss 12 to form the recess sections A, B on the ends of the tank main body 10 in its axis direction, the recess sections A, B being formed of the outside end surface 11d of the mouthpiece 11 and the outside end surface 12d of the end boss 12 embedded in the inner side from the outside end surfaces 21a, 21b of the FRP layer 21. Thus, it is possible to form the mouthpiece 11 and end boss 12 whose lengths in the axis direction are short, to reduce the weights of the mouthpiece 11 and end boss 12, and thereby to reduce the weight of the high-pressure gas tank 2. Furthermore, the formation of the FRP layer 21 by a filament winding process can be performed appropriately.

The distal end sides of the connecting parts 52 of the rotating shafts 51 have outer diameters which gradually decrease closer to each distal end. Therefore, after forming the FRP layer 21 on the outer circumferential surfaces 52b of the connecting parts 52, such connecting parts 52 can be easily detached from the mouthpiece 11, the end boss 12, and the FRP layer 21.

Since the mould release film 52c is affixed to the outer circumferential surface 52b of the connection part 52 of the rotating shaft 51, the detaching of the connection part 52 from the FRP layer 21 can be much more easily performed.

The preferable embodiment of the present invention has been described above with reference to the accompanying drawings, but the present invention is not limited to such example. It is obvious for a person skilled in the art that various alteration examples or modification examples can be thought of in the category of the idea described in claims, and it can be understood that, needless to say, these examples belong to the technical scope of the present invention.

For example, in the embodiment described above, the recess sections A, B are formed on both the mouthpiece 11 and the end boss 12, however, such recess section may be formed on either the mouthpiece 11 or the end boss 12. The recess section may be formed only on the side of the end boss 12, and in such case, a valve having an existing shape or the like can be connected to the side of a mouthpiece which allows a gas flowing in/out. In addition, the connection part 52 may be made into one piece with the rotating shaft 51, or may be a separate connection jig.

INDUSTRIAL APPLICABILITY

The present invention allows the formation of the outer circumferential layer by a filament winding process to be performed appropriately, in a gas tank, and is useful in reducing the weight of a mouthpiece to achieve the weight reduction of the gas tank.

DESCRIPTION OF REFERENCE SYMBOLS

2: high-pressure gas tank, 10: tank main body, 11: mouthpiece, 12: end boss, 20: resin liner, 21: FRP layer, 51: rotating shafts, 52: connecting parts, A, B: recess sections

What is claimed is:

1. A manufacturing method of a gas tank, comprising the steps of:
    coupling a connecting part of a rotating shaft to a mouthpiece attached to an end of a tank main body in its axis direction, the connecting part having an outer circumferential surface which continues smoothly to an outer circumferential surface of the mouthpiece;
    winding a fiber around over an outer circumferential surface of the tank main body, an outer circumferential surface of the mouthpiece and a part of an outer circumferential surface of the connecting part, while rotating the tank main body by the rotating shaft, to form an outer circumferential layer on the outer circumferential surface of the tank main body, the outer circumferential surface of the mouthpiece and a part of the outer circumferential surface of the connecting part; and
    detaching the connecting part of the rotating shaft from the mouthpiece to form, on an end of the tank in the axis direction, a recess section in which an outside end surface of the mouthpiece in the axis direction is embedded in an inner side from an outside end surface of the outer circumferential layer in the axis direction.

2. The manufacturing method of a gas tank according to claim 1, wherein a distal end side of the connecting part of the rotating shaft has an outer diameter which gradually decreases closer to an distal end.

3. The manufacturing method of a gas tank according to claim 1, wherein a mould release film is affixed to the outer circumferential surface of the connecting part of the rotating shaft.

* * * * *